US005126580A

United States Patent [19]

Hiraoka et al.

[11] Patent Number: 5,126,580

[45] Date of Patent: Jun. 30, 1992

[54] PAPER SIZE DETECTING APPARATUS

[75] Inventors: Satoshi Hiraoka, Hachioji; Muneki Chuubachi, Otsuki, both of Japan

[73] Assignee: Kabushiki Kaisha Toshiba, Kawasaki, Japan

[21] Appl. No.: 789,413

[22] Filed: Nov. 1, 1991

Related U.S. Application Data

[63] Continuation of Ser. No. 625,656, Dec. 12, 1990, abandoned.

[30] Foreign Application Priority Data

Dec. 14, 1989 [JP] Japan ........................... 1-144219[U]

[51] Int. Cl.[5] ........................................ G01N 21/86

[52] U.S. Cl. .................................. 250/560; 271/127; 271/164; 355/311

[58] Field of Search ............... 271/111, 126, 127, 162, 271/164, 171; 355/311; 250/560, 561, 548, 223 R

[56] References Cited

U.S. PATENT DOCUMENTS 4,343,461 8/1982 Tomimori et al. ............ 271/171 X
4,579,333 4/1986 Aoki ............................... 271/164 X
4,697,803 10/1987 Kan et al. ...................... 271/164 X
4,780,740 10/1988 Fukae ............................ 271/171 X
4,786,042 11/1988 Stemmle ........................ 271/171 X
4,954,846 9/1990 Matsuo et al. ..................... 355/311

FOREIGN PATENT DOCUMENTS 0172332 9/1984 Japan ................................. 271/171

*Primary Examiner*—A. T. Grimley
*Assistant Examiner*—P. Stanzione
*Attorney, Agent, or Firm*—Finnegan, Henderson, Farabow, Garrett and Dunner

[57] ABSTRACT

A detection piece is held movably, and the size of recording paper being accommodated in a cassette case is detected in correspondence with a positional pattern of a detecting tongue provided on the detection piece. Even in cases where the number of paper sizes to be detected is large, the apparatus is capable of coping with that detection without an increase in the number of detection pieces, and contributes to the simplification of the mounting and demounting operation of the detection piece, prevention of loss or erroneous mounting of the detection piece, and so on.

17 Claims, 13 Drawing Sheets

| SIZE | SENSOR SIGNAL |
| --- | --- |
| JIS B4 | 1 1 0 |
| JIS A4 | 1 0 0 |
| JIS B5 | 0 0 0 |
| JIS A5 | 0 0 1 |
| ISO B4 | 0 1 0 |
| LEGAL | 1 0 1 |
| LETTER | 0 1 1 |
| NO CASSETT | 1 1 1 |

FIG.16

PAPER SIZE DETECTING APPARATUS

This application is a continuation of application Ser. No. 625,656, filed Dec. 12, 1990, now abandoned.

BACKGROUND OF THE INVENTION

1. Field of the Invention

The present invention relates to a paper size detecting apparatus for detecting the size of recording paper accommodated selectively in a cassette case so as to be supplied to a recording system.

2. Description of the Related Art

As is known, among recording systems there are those that employ sheet paper as recording paper.

With this type of recording system, it is common to use a cassette case for supplying recording paper in correspondence with a recording operation.

There are a plurality of paper sizes with respect to the recording paper accommodated in the cassette case, and in order to effect an accurate recording operation, it is necessary to accurately detect the size of the paper accommodated in the cassette case on each such occasion.

A typical paper size detecting apparatus used for this purpose is generally arranged as shown in FIGS. 14*a* and 14*b*.

Here, FIG. 14*a* shows a structure of essential portions of a mounting surface of a cassette case 1 with the cassette case 1 loaded in a recording system. FIG. 14*b* is a cross-sectional view of the structure of the essential portions taken along the line I—I of FIG. 14*a*.

In FIGS. 14*a* and 14*b*, recording paper of any one of a plurality of paper sizes is selectively accommodated in the cassette case 1.

A detection piece holder 11 is formed integrally with a case body at a predetermined position on the mounting surface of the cassette case 1, and a detection piece 12 is secured therebelow by means of a screw 13 with one end retained by the detection piece holder 11.

The detection piece 12 has a tongue 120, and included among its configurations are those shown in FIGS. 14*a* and 14*b*, as well as FIGS. 15*a* to 15*c*.

The configurations of detection pieces 12A-12C shown in FIGS. 15*a* to 15*c* correspond to configurations as viewed in the direction of arrow II of FIG. 14*a* when they are mounted on the cassette case 1.

In FIGS. 15*a* to 15*c*, the detection pieces 12A, 12B, and 12C are respectively provided with tongues 120A, 120B, and 120C projecting perpendicularly from their mounting surfaces when they are mounted on the cassette case 1, and their configurations are different, respectively.

The configurations of these tongues 120A, 120B, and 120C correspond to the sizes of the recording paper that can be accommodated in the cassette case 1. For instance, the detection piece 12A has a length corresponding to the JIS (Japanese Industrial Standards) A4 size in the horizontal direction of FIG. 15*a*. In a similar manner, the detection pieces 12B and 12C have lengths corresponding to JIS B5 and A5 sizes, respectively.

In actual application, as for these detection pieces 12A, 12B, and 12C, those each provided with a tongue of the length corresponding to the size of the recording paper to be accommodated in the cassette case 1 are selected. These detection pieces are mounted on the cassette case 1 by means of the screw 13 in each case.

As recording systems in which the cassette case 1 is loaded, for instance, facsimile machines, copying machines, and the like are conceivable.

A sensor 14 is provided on the main body of such a recording system at a position where the tongues 120A, 120B, and 120C of the detection pieces 12A, 12B, and 12C are opposed to the main body when the cassette case 1 is loaded (see FIGS. 14*a* and 14*b*).

The sensor 14 is constituted by, for instance, a transmission-type photosensor.

In the example shown in FIGS. 14*a* and 14*b*, the sensor 14 is constituted by a plurality of pairs of light-emitting elements 14A and light-receiving elements 14B that are juxtaposed at predetermined intervals in such a manner as to sandwich the tongue 120 of the detection piece 12 on the mounting surface of the cassette case 1 when the cassette case 1 is loaded in the recording system.

This sensor produces a signal corresponding to, for instance, "0" when the tongue 120 of the detection piece 12 is present between the light-emitting element 14A and the light-receiving element 14B, and produces a signal corresponding to "1" when it is absent therebetween.

As a result, sensor signals are obtained from the sensor 14 in correspondence with the configuration of the tongue of the detection piece 12 mounted on the cassette case 1 at that time, as shown in the table of FIG. 16.

These sensor signals respectively correspond to the paper sizes listed in the left-hand column of the table of FIG. 16 on a one-to-one correspondence basis.

Accordingly, if these sensor signals are introduced to and processed by an unillustrated detection circuit, it is possible to detect the size of the recording paper presently accommodated in the cassette case 1.

With the paper size detecting apparatus in which the detection piece corresponding to the size of the recording paper is used by being replaced on each such occasion, the detection pieces are required for the respective sizes of the recording paper that can be accommodated in the cassette case 1, so that the number of the detection pieces unavoidably increases as the number of paper sizes to be detected increases.

Even in cases where the paper sizes are detected within a range which does not practically cause inconveniences, the number of detection pieces corresponding to the paper sizes shown in FIG. 16 is generally considered to be a minimum requirement.

In addition, with the above-described apparatus in which the detection piece is replaced by removing the screw each time when the recording paper to be accommodated in the cassette case is replaced, the operation of replacing the detection piece has been inevitably troublesome.

At that time, only one detection piece can be mounted on the cassette case, and the remaining ones are left as they are without being used, so that the management of the detection pieces not in use has been difficult and there are even many cases where they are possibly lost.

In addition, the fact that the number of the detection pieces is large means that the number of cases where the detection piece is erroneously mounted on the cassette case increases by that margin.

Furthermore, with this type of paper size detecting apparatus, as the number of paper sized to be detected increases, there arises the need to form tongues having corresponding configurations for the respective detection pieces.

For this reason, detection pieces having tongues of sufficiently large configurations have been required to cope with the processing of the detection pieces, so that the tendency of the detection pieces to become large in their structure has been unavoidable.

SUMMARY OF THE INVENTION

Accordingly, an object of the present invention is to provide a paper size detecting apparatus capable of preventing the loss of detection pieces and facilitating the management thereof without entailing an increase in the number of the detection pieces in cases where the number of paper sizes to be detected is large.

Another object of the present invention is to provide a paper size detecting apparatus which does not force a troublesome detection piece-replacing operation each time the size of recording paper to be accommodated in the cassette case changes.

Still another object of the present invention is to provide a paper size detecting apparatus in which the structure of each detection piece can be made compact.

A further object of the present invention is to provide a paper size detecting apparatus capable of preventing a detection piece from being erroneously mounted on a cassette case.

A still further object of the present invention is to provide a paper size detecting apparatus capable of readily positioning the detection piece at a predetermined holding position corresponding to the size of recording paper to be accommodated in the cassette case.

A further object of the present invention is to provide a paper size detecting apparatus in which, at the time of replacing recording paper with recording paper of a different size into the cassette case, the detection piece can be moved positively to a proper holding position corresponding to the paper size at the same time as replacement of the recording paper, thereby contributing to constantly accurate detection of the paper size.

A further object of the present invention is to provide a paper size detecting apparatus in which, even in cases where the standard of the paper size differs, the paper size concerning that standard can be detected readily and accurately.

To these ends, in accordance with the present invention, the paper size detecting apparatus comprises: a detection piece having a detecting tongue of a configuration used commonly for a plurality of paper sizes; detection piece holding means disposed on either one of the cassette case or a system into which the cassette case is loaded, the detection piece holding means being adapted to movably hold the detection piece; positional pattern detecting means for detecting a positional pattern of the detecting tongue resulting from the movement of a position in which the detection piece is held in the detection piece holding means; and paper size detecting means for producing a signal corresponding to the size of recording paper being accommodated in the cassette case on the basis of the positional pattern detected by the positional pattern detecting means.

In addition, in the present invention, the detection piece holding means comprises a resilient member having a corrugated configuration, and the detection piece which is held by the detection piece holding means comprises a member having on one side thereof a corrugated configuration fitting with the resilient member.

In addition, in the present invention, the corrugated configurations of the resilient member and the detection piece which fit with each other are so arranged that the detection piece which moves relative to the resilient member can be retained only at individual positions corresponding to all the paper sizes that can be detected by using the detection piece.

In addition, in the present invention, the cassette case is provided with a partition plate at a position corresponding to the size of recording paper so as to fix a position in which the recording paper is accommodated in the cassette case, the partition plate being movable to the accommodating position, and the detection piece is arranged to be moved in interlocking relationship with the partition plate relative to the detection piece holding means.

In addition, in the present invention, as the detecting tongue, one formed into a different configuration for each standard of paper size is used.

Thus, in accordance with the paper size detecting apparatus, the arrangement provided is such that one detection piece is held movably in detecting a plurality of paper sizes, and a positional pattern of the detecting tongue resulting from the movement of the detection piece is made to correspond to the size of the recording paper being accommodated in the cassette case so as to detect the paper size. Accordingly, even in cases where the number of paper sizes to be detected increases, there is no need to increase the number of detection pieces.

The reduction in the number of detection pieces contributes to the prevention of loss thereof and facilitates the management thereof.

In addition, in the present invention the detection piece holding means comprises a resilient member which allows the detection piece to slide freely.

For this reason, at the time when the size of the recording paper to be accommodated in the cassette case is to be changed, the detection piece can be moved to a corresponding holding position corresponding to the paper size simply by sliding the detection piece in the holding means. Thus, as compared with the apparatus of a type in which the detection piece is mounted and demounted by means of a screw or the like, the operation of replacing the detection piece can be simplified substantially.

The reduction in the number of detection pieces in the apparatus of this invention brings about a reduction in the number of configurations of the tongues accompanying the detection pieces.

This means that even if the size of the tongue of the detection piece is made sufficiently small, the processing of the configuration of the tongue in correspondence with various paper sizes is possible. As a result, it is possible to make the structure of the overall detection piece compact.

In addition, in the present invention, the resilient member constituting the detection piece holding means is formed into a corrugated configuration, while only one side of the detection piece to be held by the same is processed into a configuration suitable for fitting with the resilient member.

By virtue of the processing of the resilient member and the detection piece into a corrugated configuration so as to fit with each other, the mounting of the detection piece on the detection piece holding means can be effected only in a fixed posture, so that the erroneous mounting of the detection piece can be prevented.

Furthermore, in the present invention, at the time of the processing of the resilient member and the detection piece into a corrugated configuration so as to fit with each other, it is so designed that the movement of the detection piece can be effected only between predetermined intervals corresponding to various sizes of recording paper that can be accommodated in the cassette case.

By virtue of that design requirement and the resiliency of the resilient member, the detection piece can be positioned accurately at a predetermined position corresponding to the size of the recording paper accommodated in the cassette case in the process in which detection piece is slid in stages while sequentially passing the positions set at predetermined intervals for the respective paper sizes.

In addition, in the present invention, a partition plate is used so as to fix positions in which the recording paper of various sizes is accommodated in the cassette case, and the detection piece is arranged to be movable in interlocking relationship with the partition plate.

For this reason, at a time when recording paper is to be replaced with recording paper of a different size, the detection piece is unfailingly moved to a position corresponding to that paper size as a result of movement of the partition plate at that time.

In consequence, when recording paper accommodated in the cassette case is replaced, it is possible to hold the detection piece positively at a position matching the paper size without the user becoming aware of the positioning of the detection piece, thereby constantly contributing to accurate detection of the paper size.

Furthermore, in the present invention, since a detection piece is prepared for each paper size of a different standard, even in cases where a plurality of standards are present, it is possible to readily and accurately conduct the detection of paper sizes of these various standards.

For instance, as paper sizes, those of the JIS standards and ISO standards (letter size, legal size, etc.) are available among other standards. In the present invention, however, in a case where detection is to be effected for all of these paper sizes of these two standards, by simply preparing two types of detection pieces respectively corresponding to the JIS standards and ISO standards and by selectively using them, it is possible to increase the number of paper sizes to be detected without resulting in an increase in the number of detection pieces used.

The above and other objects, features and advantages of the invention will become more apparent from the following detailed description of the invention when read in conjunction with the accompanying drawings.

BRIEF DESCRIPTION OF THE DRAWINGS

FIG. 16 is a table illustrating an example of an output signal pattern obtained from the paper size detecting apparatus of this type in correspondence with paper sizes to be detected.

DESCRIPTION OF THE PREFERRED EMBODIMENTS

Referring now to the accompanying drawings, a detailed description will be given of the preferred embodiments of the present invention.

Figure 1:
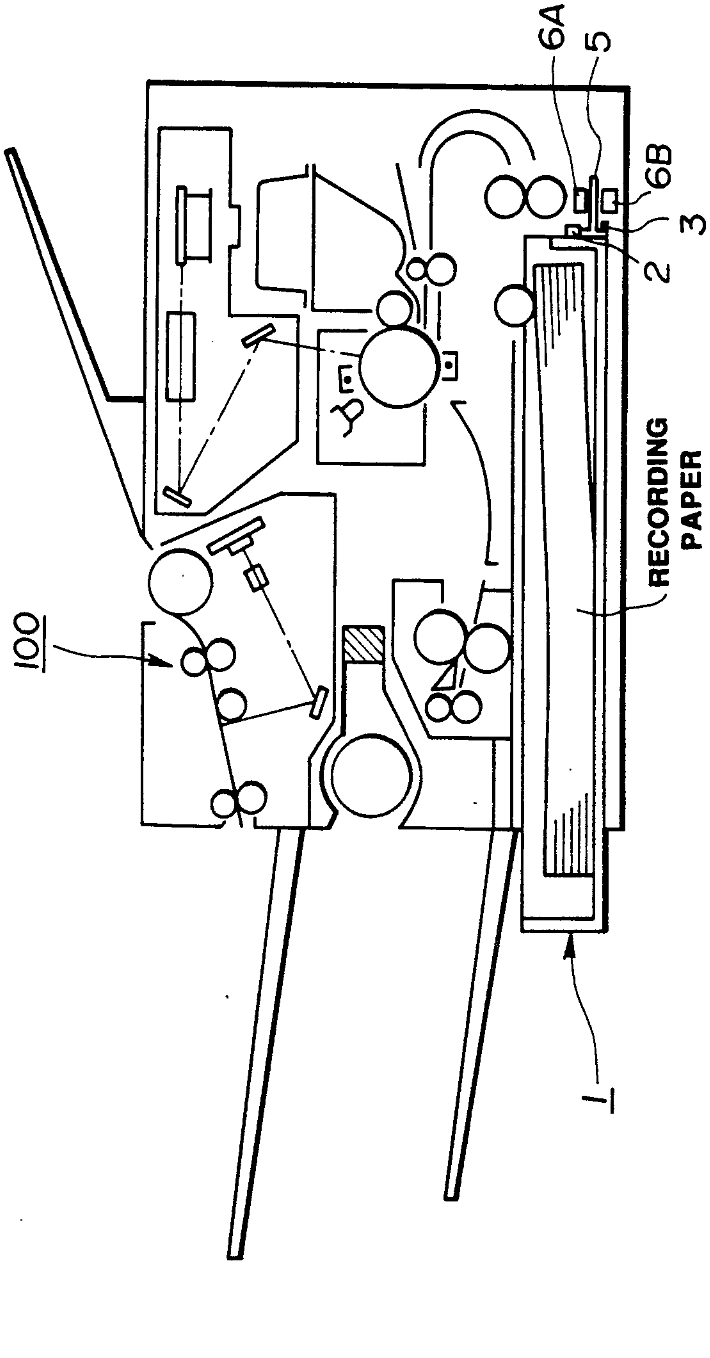
FIG. 1 is a diagram schematically illustrating an overall configuration of a recording system provided with a paper size detecting apparatus in accordance with the present invention.

FIG. 1 is a conceptual drawing illustrating an overall configuration of a recording system provided with a paper size detecting apparatus in accordance with the present invention.

In FIG. 1, a recording system 100 detachably holds a cassette case 1.

This cassette case 1 is capable of selectively accommodating recording paper in the form of sheets of a plurality of different paper sizes, and is adapted to supply the recording paper of a predetermined size being accommodated to a recording station in correspondence with a recording operation when the cassette case 1 is loaded in the recording system 100 (see FIG. 1).

As is apparent from FIG. 1, the cassette case 1 is provided with a mechanism for holding a detection piece 5 by means of an upper detection piece holder 2 and a lower detection piece holder 3 as a constituent element of the paper size detecting apparatus. The recording system 100 is provided with light-emitting elements 6A and light-receiving elements 6B in face-to-face relationship with that mechanism.

Figure 2A:
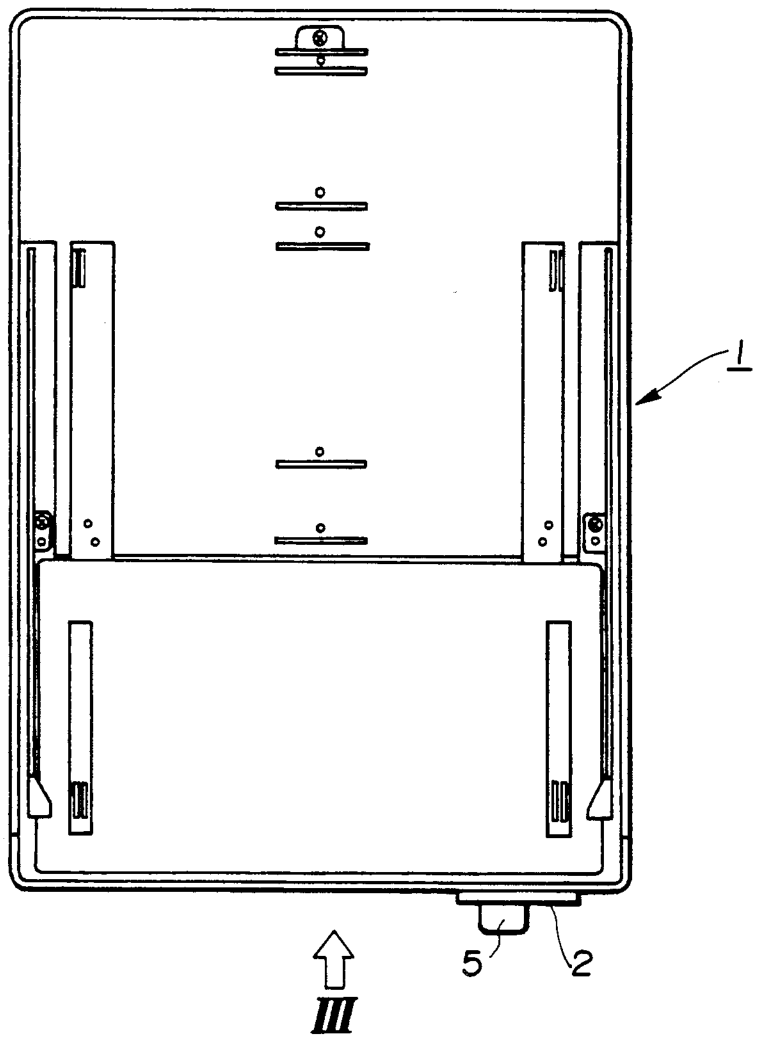
FIG. 2*a* is a top plan view of a cassette case to which the paper size detecting apparatus in accordance with a first embodiment of the present invention is applied.

FIG. 2*a* illustrates an independent configuration of the cassette case 1 when unloaded from the recording system 100 so as to describe a detailed configuration of this mechanism.

Figure 2B:
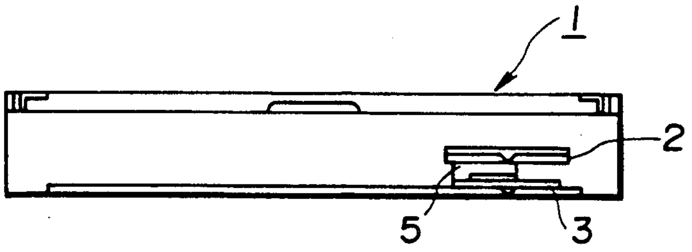
FIG. 2*b* is a side-elevational view of the cassette case taken in the direction of arrow III of FIG. 2*a;*

Furthermore, FIG. 2*b* is a diagrammatic view of a structure of a side surface of the cassette case 1 taken in the direction of arrow III in FIG. 2*a*.

In FIGS. 2*a* and 2*b*, the constituent elements of the paper size detecting apparatus in accordance with the present invention are disposed on a surface of the cassette case 1 for mounting on the recording system 100, and the detection piece 5 is held by the upper detection piece holder 2 and the lower detection piece holder 3.

Figure 3B:
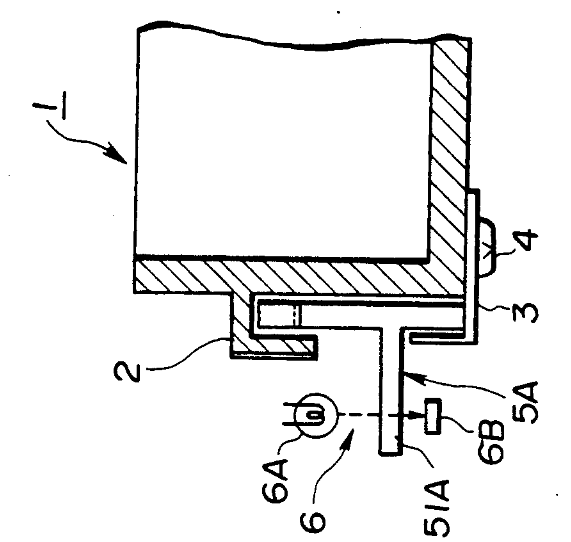
FIG. 3*b* is a cross-sectional view of a structure of essential portions taken along the line IV—IV of FIG. 3*a;*
Figure 3A:
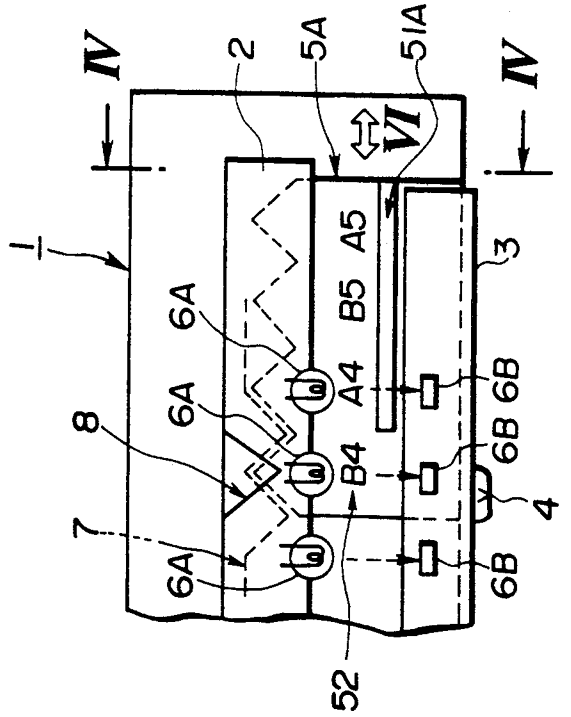
FIG. 3*a* is a diagram illustrating an arrangement of essential portions of one side surface of the cassette case shown in FIGS. 2*a* and 2*b* with the cassette case loaded in the recording system.

A more detailed arrangement of these constituent elements is shown in FIGS. 3*a* and 3*b*.

FIG. 3*a* illustrates an arrangement of essential portions in a state in which the cassette case 1, when loaded in the recording system 100, is viewed from the mounting surface side, while FIG. 3*b* is a cross-sectional view of a structure of the essential portions taken along the line IV—IV of FIG. 3*a*.

In FIGS. 3*a* and 3*b*, the upper detection piece holder 2 is first formed integrally with the cassette case 1.

The lower detection piece holder 3 is secured at an opposing position below the upper detection piece holder 2 by means of a screw 4.

The upper detection piece holder 2 and the lower detection piece holder 3 are disposed by maintaining a predetermined interval therebetween, thereby forming a holding mechanism for the detection piece 5.

Figure 4A:
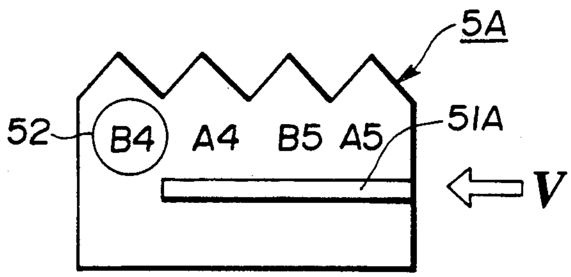
FIG. 4*a* and FIG. 5*a* are diagrams illustrating examples of detection pieces used in the paper size detecting apparatus in accordance with the first embodiment of the present invention.
Figure 4B:
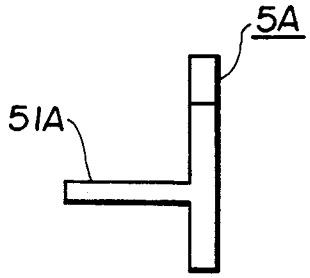
FIG. 4*b* is a side-elevational view of a detection piece taken in the direction of arrow V in FIG. 4*a;*

A detection piece 5A of the present invention to be held by this holding mechanism is different from a conventional one, and has a configuration such as the one shown in, for instance, FIGS. 4*a* and 4*b*.

Here, FIG. 4*b* illustrates a structure of a side surface of the detection piece 5A as viewed in the direction of arrow V in FIG. 4*a*.

In FIGS. 4*a* and 4*b*, the detection piece 5A is arranged such that a tongue 51A is stood on a main body base and an upper end portion of the main body base is formed in a serrate or corrugated configuration.

The difference of this detection piece 5A with a conventional one lies in that only one detection piece 5A can cope with the detection of a plurality of paper sizes in each case.

For that reason, the kinds of paper sizes capable of being detected by one detection piece 5A are inscribed on an upper portion of the tongue 51A of the main body base as size indices 52.

If attention is focused on the paper size indices 52, it can be seen that, in the example of application shown in FIG. 3*a*, for instance, the detection piece 5A is used jointly for detecting the respective paper sizes of JIS (Japanese Industrial Standards) B4, A4, B5, and A5.

Meanwhile, the holding mechanism for the detection piece 5A is so devised as to hold the detection piece 5A movably in the direction of arrow VI in FIG. 3*a*.

That is, in the present invention, a resilient carrier 7 having a configuration fitting with the serrate configuration of the upper end portion of the detection piece 5A is provided on the inner side of the upper detection piece holder 2 constituting an element of the detection piece holding mechanism.

Furthermore, positioning mark 8 which is indicated by an arrow or the like is formed at a predetermined position of a surface of the upper detection piece holder 2.

By virtue of the above-described structure, in the present invention, the detection piece 5A can be held securely by fitting together the serrate portions of the resilient carrier 7 and the detection piece 5A while maintaining the relative positional relationship between the two members and by making use of the resiliency of the resilient carrier 7.

What is important here is the resiliency of the resilient carrier 7.

By appropriately selecting the resiliency, when a force acting in the direction of arrow VI in FIG. 3*a* is applied inside the detection piece holding mechanism, the detection piece 5A is capable of moving in the direction of stress while springing up the serrate portion of the resilient carrier 7 with its serrate portion.

At that juncture, the serrate portion of the detection piece 5A fits at each ridge portion thereof with each corresponding trough portion of the serrate portion of the resilient carrier 7 each time the detection piece 5A is moved by one pitch.

It can be thus appreciated that the detection piece 5A can be moved in the detection piece holding mechanism by each pitch while being slide in stages.

In the present invention, the paper size indices on the detection piece 5A are formed in correspondence with the aforementioned pitches of movement.

A a result, in cases where the detection piece 5A is moved leftward from the state of being held shown in FIG. 3*a*, each time the detection piece 5A is moved by one stage, the detection piece 5A moves in stages in such a manner that each of the paper size indices 52 is matched with the positioning mark 8 provided on the upper detection piece holder 2A in the order of B4, A4, B5, and A4.

A transmission-type sensor 6 is provided in the recording system 100 and is arranged such that a plurality of pairs of the light-emitting element 6A and the light-receiving element 6B are arranged in correspondence with the detection piece 5A and the detection piece holding mechanism thus arranged, in such a manner as to be capable of sandwiching the tongue 51A of the detection piece 5A when the cassette case 1 is completely loaded in the recording system 100.

In this embodiment, three pairs of the light-emitting element 6A and the light-receiving element 6B are used, and each interval between the adjacent ones of the pairs is set to be the same pitch as that of the paper size indices 52 on the detection piece 5A.

As a result, in the present invention, when the detection piece 5A is slid in stages leftward from the state shown in FIG. 3*a*, the detection piece 5A moves in such a manner that the tongue 51A of the detection piece 5A shields the detection light of one pair of sensor elements after another, starting with the one located on the extreme right toward the one located on the extreme left as each of the paper size indices 52 is matched with the positioning mark 8 in the order of B4, A4, B5, and A5.

Then, the size of the recording paper being accommodated in the cassette case 1 can be detected by means of a sensor signal, such as the one shown in FIG. 16, obtained from the sensor 6.

It should be noted that in the paper size detecting apparatus of the present invention it is necessary to change the holding position of the detection piece 5A in correspondence with the size of the recording paper being accommodated in the cassette case 1.

A the time of changing the holding position, it is possible to cope with the change by sliding the detection piece 5A by making use of the resiliency of the resilient carrier 7, as described above, and the position can be changed simply without removing the detection piece 5A on each occasion.

In addition, the position to which the detection piece 5A should be moved in correspondence with the size of the recording paper being accommodated in the cassette case 1 can be understood at a glance through the relationship between the paper size index 52 and positioning mark 8.

Furthermore, the fitting of the serrate portions of the resilient carrier 7 and the detection piece 5A acts effectively in the positioning of the detection piece 5A at that time.

A description will now be given of a specific example of application of the paper size detecting apparatus in accordance with the present invention.

First, in mounting the detection piece 5A on the cassette case 1, the detection piece 5A is pressed against the resilient carrier 7 in such a manner that a desired paper size index 52 will match the paper size matching mark 8 in a state in which the lower detection piece holder 3 is removed in FIG. 3*a*. Then, the lower detection piece holder 3 is secured by means of the screw 4.

At that juncture, the serrate portion of the detection piece 5A and the serrate portion of the resilient carrier 7 fit each other, so that the detection piece 5A is held securely.

It should be noted that at the paper size index 52 that that juncture, one corresponding to the size of the paper being accommodated in the cassette case 1 is selected.

Through the above-described operation, the detection piece 5A fits with the resilient carrier 7 at its upper end portion and is held securely by means of the resiliency of the resilient carrier 7.

Here, the resiliency of the resilient carrier is selected appropriately, and as appropriate stress is applied thereto, the detection piece 5A can be moved in the direction of arrow VI, as required, at the pitch of layout of the sensor 6.

In consequence, the detection piece 5A is moved in such a manner that, for instance, the paper size index 52 of B4 will match the positioning mark 8 when B4 size paper is accommodated in the cassette case 1, and the paper size index 52 of A4 will match the positioning mark 8 when A4 size paper is accommodated, respectively, thereby making it possible to obtain correspondence with the size of the paper being accommodated in the cassette case 1 on each such occasion.

A description will now be given of the fact that the detection of paper size can be effected accurately by loading in the recording system 100 the cassette case 1 holding the detection piece 5A of this invention.

For instance, the example of FIG. 3*a* shows a state in which the cassette case 1 in which the detection piece 5A is set in such a manner that the paper size index 52 of B4 matches the positioning mark 8 is loaded in the recording system.

At this juncture, the tongue 51A of the detection piece 5A is present in such a manner as to shield only the optical path of the right-end pair of elements of the sensor 6.

Here, since the operational characteristic of the sensor 6 is an output 0 when the optical path is shielded and an output 1 when it is not shielded, as described above, the sensor signal obtained at this time shows the pattern "1, 1, 0".

If reference is had to FIG. 16, it can be appreciated that that sensor signal corresponds to the paper size of B4, and it is apparent from this fact that the detection of the paper size of B4 is carried out properly with the apparatus of this invention.

If considered in a similar manner, it can be seen that the other paper sizes can also be detected accurately.

For instance, if recording paper of A4 size is placed in the cassette case 1, it is necessary to move the stage so as to adjust the paper size index 52 of A4 to the positioning mark 8.

At this juncture, the tongue 51A of the detection piece 5A moves up to a position in which it shields the right two pairs of elements of the sensor 6.

At that time, the sensor signal obtained by the three pairs of elements of the sensor 6 is the pattern "1, 0, 0".

This sensor signal corresponds to the paper size of A4, it follows therefore that accurate detection is effected in this case as well.

In this embodiment, partly because three pairs of elements are provided as the sensor 6, only four kinds of paper size in JIS standards can be detected strictly with the above-described configuration of the tongue of the detection piece 5A.

On the other hand, as the paper sizes to be detected, there those of the ISO standards such as letter size, legal size, etc., in addition to the aforementioned JIS standards (see FIG. 16).

Figure 5A:
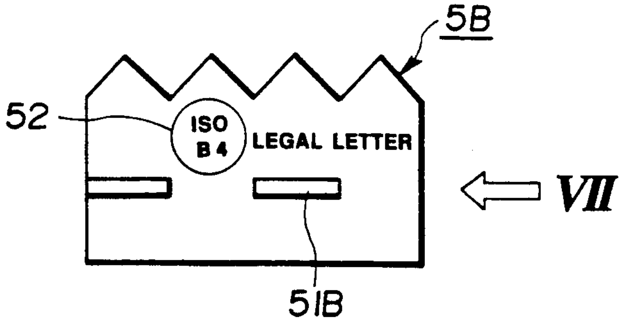
Figure 5B:
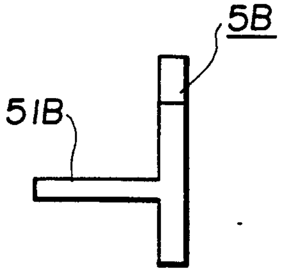
FIG. 5*b* is a side-elevational view of the detection piece taken in the direction of arrow VII in FIG. 5*a;*

Accordingly, in order to enable the detection of the paper sizes of these ISO standards, it suffices to prepare newly a detection piece 5B having configurations of tongues such as those shown in FIGS. 5*a* and 5*b*.

It should be noted that FIG. 5*b* is a diagrammatic view of the structure taken in the direction of arrow VII in FIG. 5*a*.

A description will now be given of the fact that the paper sizes can be detected properly by using this detection piece 5B.

Figure 6:
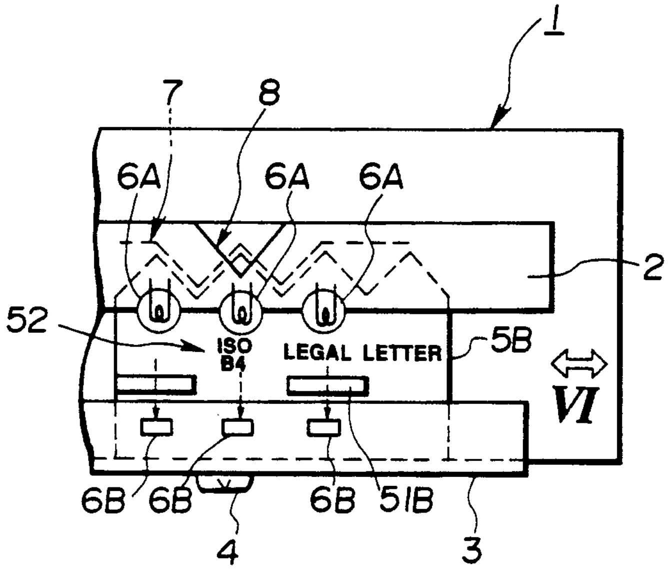
FIG. 6 is a diagram illustrating a state in which the detection piece shown in FIG. 5*a* is held by a detection piece holding mechanism shown in FIG. 3*a;*

FIG. 6 shows the mounting surface of the cassette case 1 at a time when the detection piece 5B is mounted in such a manner that the paper size index 52 indicating the ISO standard B4 can be matched with the positioning mark 8.

In this state, the optical paths of the right-end and left-end elements of the sensor 6 are shielded by virtue of the configuration of a tongue 51B of the detection piece 5B, and the pattern "0, 1, 0" is obtained as the sensor signal.

This sensor signal corresponds to the paper size of ISO Standard B4 in FIG. 16, thereby substantiating accurate detection of the paper size.

Thus, in the present invention, a plurality of paper sizes can be detected by using the detection pieces 5A and 5B based on only two specifications, as shown in FIG. 16.

Such a reduction in the number of detection pieces 5 with respect to the number of sizes to be detected contributes to the overcoming of problems in management, such as incorrectly attaching the detection piece 5 or losing it.

Furthermore, in the present invention, since a measure has been taken to prepare a different detection piece for each standard, there is no need to process the tongue into a complicated pattern of configuration, and it becomes possible to avoid making the size of the tongue unduly large.

It should be noted that although in the above-described embodiment an example has been shown in which the upper portions of the detection pieces 5A and 5B are processed into a serrate configuration, it is unnecessary to restrict the configuration to the same.

For instance, if a gentle wavelike configuration is adopted, the sliding of the detection piece in the direction of arrow E in FIG. 3*a* can be effected more easily.

In that case, even if the lower detection piece holder 3 is so designed as to be fixed in advance, the detection piece 5 can be moved, facilitating the mounting and demounting operation.

In addition, in the present invention the mechanism for holding the detection piece 5 can be provided not only on the surface of the cassette case 1 for mounting on the recording system but also on its side surface.

Figure 7A:
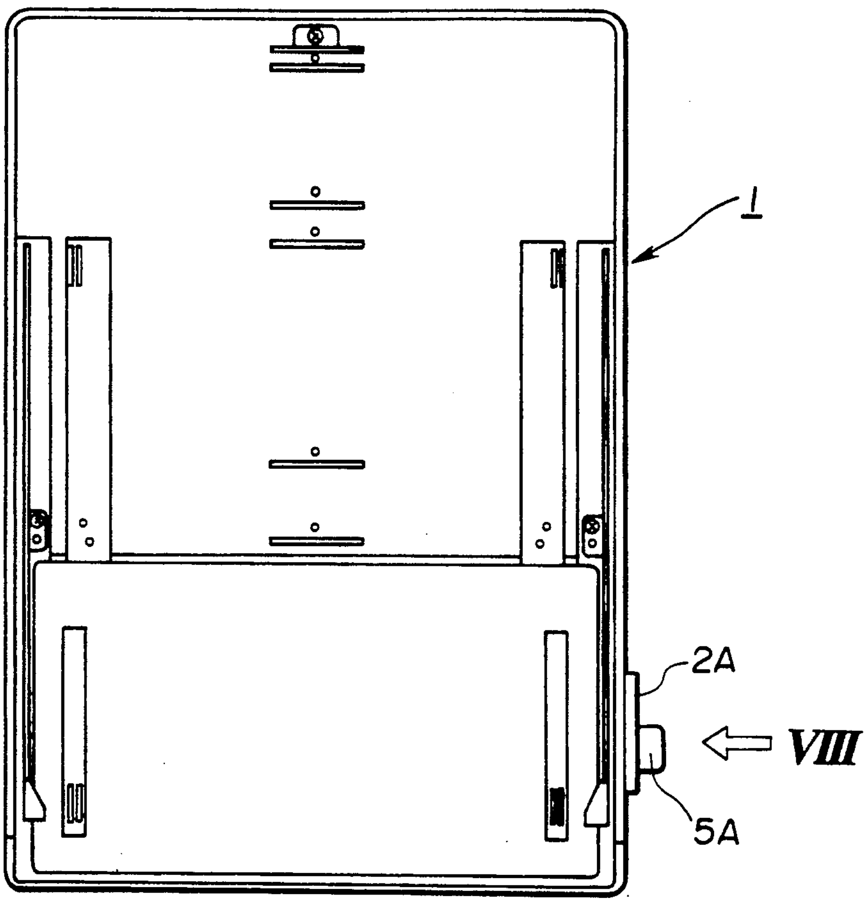
FIG. 7*a* is a top plan view of the cassette case to which the paper size detection apparatus in accordance with a second embodiment of the present invention is applied.
Figure 7B:
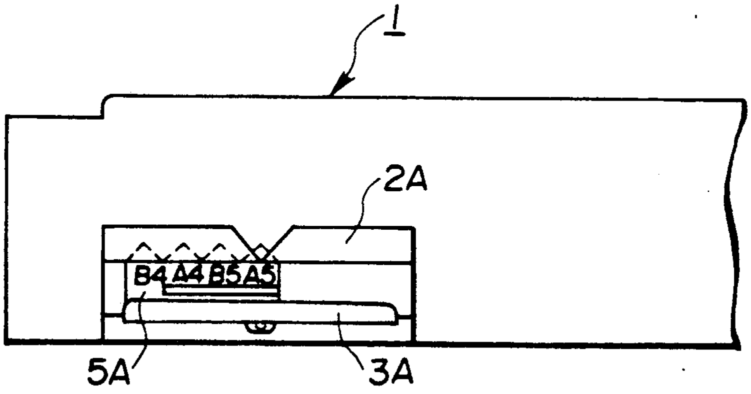
FIG. 7*b* is an enlarged view of essential portions of a side surface of the cassette case taken in the direction of arrow VIII in FIG. 7*a;*

FIGS. 7*a* and 7*b* illustrate a structure of the cassette case 1 corresponding to that embodiment.

Here, FIG. 7*a* is a top plan view of the cassette case 1, and FIG. 7*b* is an enlarged side-elevational view of a structure of essential portions taken in the direction of arrow VIII in FIG. 7*a*.

In the case of this embodiment, it goes without saying that, inside the recording system 100, the sensor means for detecting the detection piece 5A also needs to be provided along the direction in which the detection piece 5A is disposed.

Figure 8A:
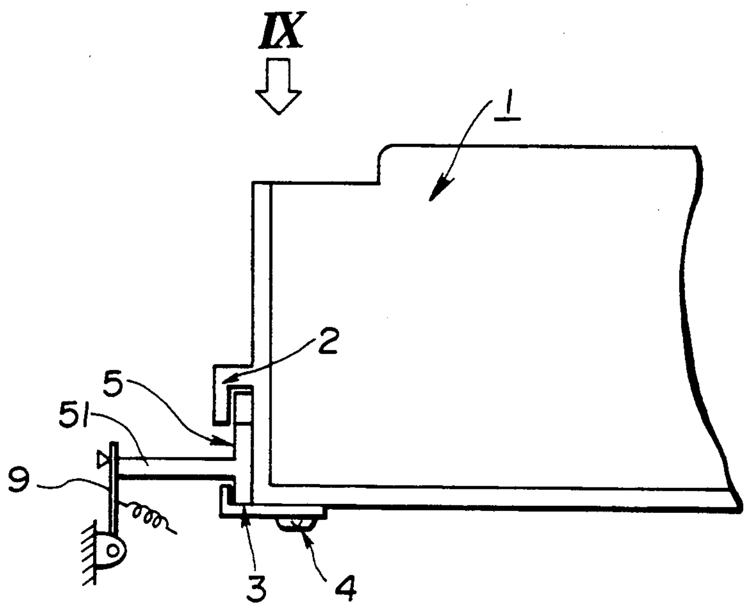
FIG. 8*a* is a cross-sectional view of essential portions of a side surface of the paper size detecting apparatus in accordance with a third embodiment of the present invention.
Figure 8B:
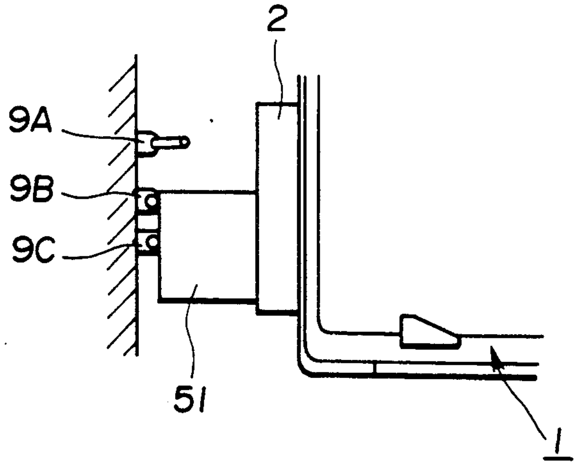
FIG. 8*b* is a diagrammatic view of an arrangement of essential portions of an upper surface of the cassette case taken in the direction of arrow IX in FIG. 8*a;*

As another embodiment of the present invention, it is possible to employ the cassette case 1 having a structure such as the one shown in FIGS. 8*a* and 8*b*.

Here, FIG. 8*a* illustrates a cross-sectional structure of essential portions of a side surface of the cassette case 1 corresponding to FIG. 3*b*, and FIG. 8*b* illustrates a structure of essential portions of an upper surface of the cassette case 1 as viewed in the direction of arrow IX in FIG. 8*a*.

In FIGS. 8*a* and 8*b*, the detection piece 5 having the tongue 51 is held by the detection piece holding mechanism which is constructed in the same way as in FIG. 3*b* but is disposed on the side of the cassette case 1.

Meanwhile, arranged in the recording system 100, into which the cassette case 1 is loaded are microswitches 9A–9C at a position which the tongue 51 of the detection piece 5 faces with the cassette case 1 loaded.

The manner in which the microswitches 9A–9C are arranged may be the same as that of the transmission-type sensor 6, for instance, and in this example the three microswitches 9A–9C are juxtaposed in order along the movement of the detection piece 5.

Here, each of the microswitches 9A–9C is set so as to output a signal corresponding to "0" when it is pressed by the tongue 51 of the detection piece 5 and output a signal corresponding to "1" when it is not, for example.

According to this setting, it is possible to detect various paper sizes corresponding to the signal pattern shown in the left-hand column of FIG. 16 by processing the signal obtained from the microswitches 9A–9C with a similar pattern to that of the sensor signal shown in FIG. 16.

Figure 9A:
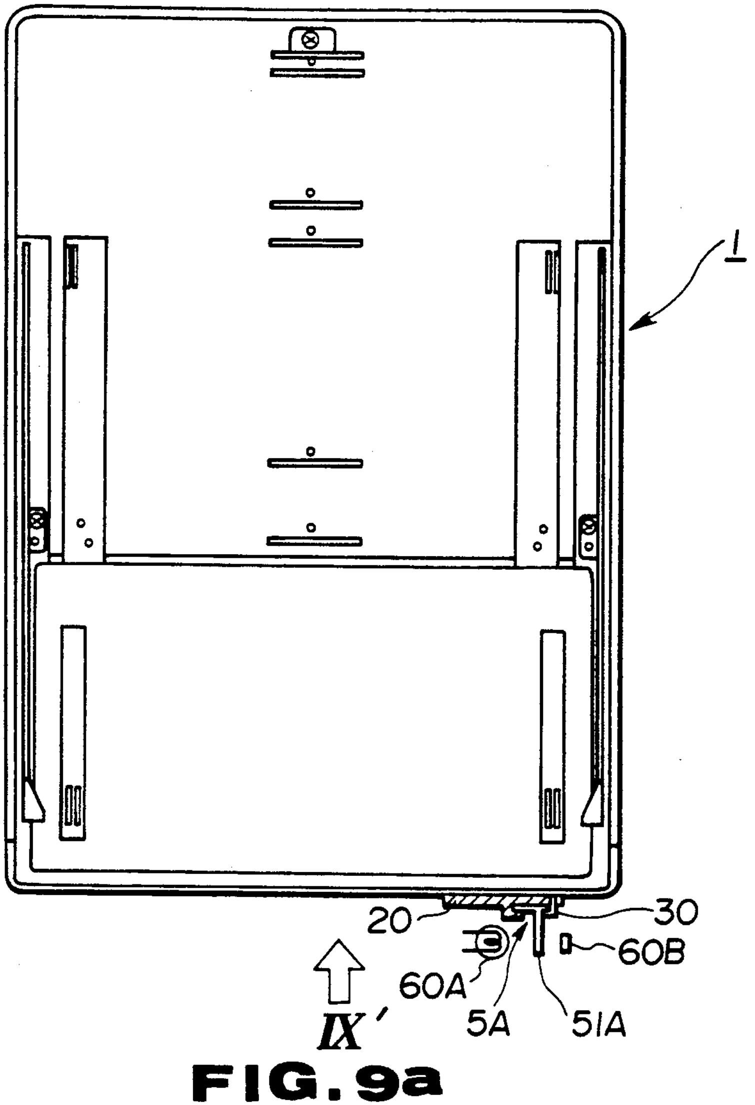
FIG. 9*a* is a top plan view of the cassette case to which the paper size detecting apparatus in accordance with a fourth embodiment of the present invention is applied.
Figure 9B:
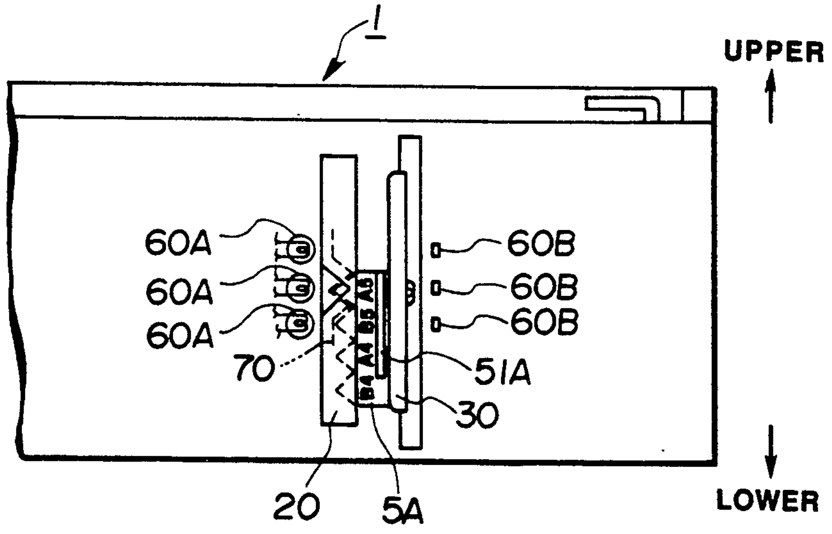
FIG. 9*b* is an enlarged view of essential portion of a side surface of the cassette case taken in the direction of arrow IX' in FIG. 9*a;*

Furthermore, the structure of the cassette case 1 such as the one shown in FIGS. 9*a* and 9*b* is also conceivable as still another embodiment of the present invention.

Here, FIG. 9*a* is a top plan view of the cassette case 1, while FIG. 9*b* is an enlarged view of a side surface of the cassette case 1 taken in the direction of arrow IX' in FIG. 9*a*.

The cassette case 1 according to this embodiment is provided with detection piece holders 20 and 30 which hold the detection piece 5 movably perpendicularly to the plane of the recording paper being accommodated.

A resilient carrier 70 corresponding to the resilient carrier 7 in FIG. 3*a* is incorporated in the detection piece holder 20, and the vertically sliding movement of the detection piece 5A is made possible by means of the resiliency of the resilient carrier 7 and its configuration fitting with the upper serrate portion (a left-hand portion in FIG. 9*b*) of the detection piece 5A.

Meanwhile, provided in the recording system 100, into which the cassette case 1 is loaded, is a transmission-type sensor having three pairs of a light-emitting element 60A and a light-receiving element 60B arranged in a juxtaposed manner along the direction of movement of the detection piece 5A.

In this embodiment as well, it is possible to detect various paper sizes in correspondence with an output signal pattern, such as the one shown in FIG. 16, which is obtained from the transmission-type sensor as a result of the vertical movement of the detection piece 5A.

Figure 10A:
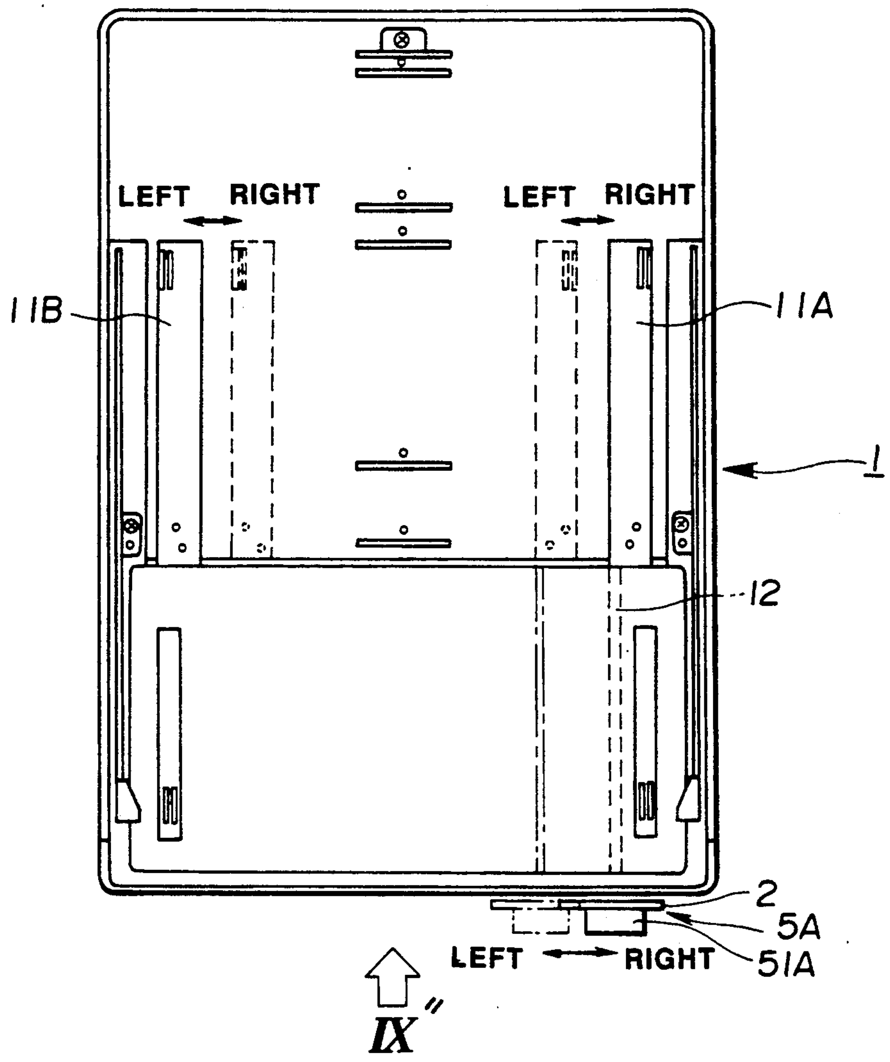
FIG. 10*a* is a top plan view of the cassette case to which the paper size detecting apparatus in accordance with a fifth embodiment of the present invention is applied.
Figure 10B:
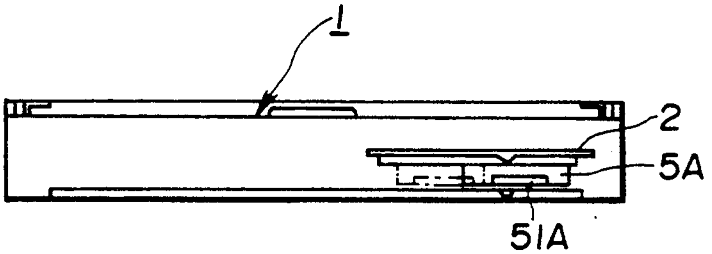
FIG. 10*b* is a side-elevational view of the cassette case taken in the direction of arrow IX" in FIG. 10*a;*

Furthermore, as a further embodiment of the present invention, the cassette case 1 may be constructed a shown in FIGS. 10*a* and 10*b*.

FIG. 10*a* is a top plan view of the cassette case 1, while FIG. 10*b* is an enlarged view of essential portions of a side surface of the cassette case 1 taken in the direction of arrow IX in FIG. 10*a*.

In FIG. 10*a*, provided on a recording-paper carrying surface of the cassette case 1 are a pair of partition plates 11A and 11B capable of moving horizontally as viewed in the drawing so as to secure the sides of the recording paper in correspondence with the size of the recording paper to be accommodated.

As a special arrangement of the cassette case 1, the detection piece 5A disposed on the outer side of the cassette case 1 is connected to one of the partition plates, i.e., the partition plate 11A, via a connecting member 12.

By virtue of the above-described arrangement, the detection piece 5A constantly moves horizontally as viewed in the drawing in interlocking relationship with the partition plate 11A.

Consequently, in a case where the recording paper is to be replaced with recording paper of a different size, when the partition plates 11A and 11B are moved in correspondence with the size of the recording paper, the detection piece 5A moves in interlocking relationship with the partition plate 11A, so that the detection piece 5A can be moved reliably to a position adjusted to that paper size.

Accordingly, if the sensor elements 6A such as those shown in FIGS. *3a* and *3b* are disposed in the recording system 100 with respect to the detection piece 5A, detection of various paper sizes such as those shown in FIG. 16 can be effected in correspondence with the output signal pattern of the sensor elements 6A in the same way as described above.

A description will now be given hereinunder of the specific operation of the recording system having the above. described paper size detecting apparatus.

Figure 11:
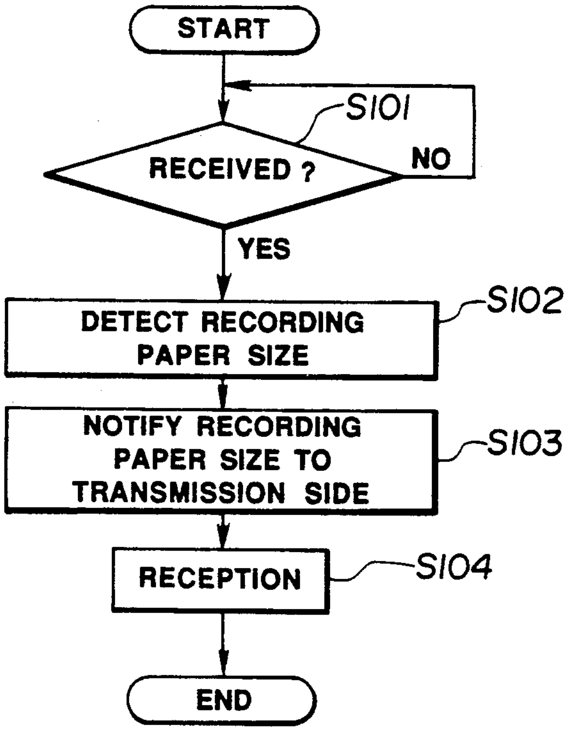
FIGS. 11 and 12 are flowcharts of examples of a receiving operation using a facsimile machine to which the paper size detecting apparatus of this invention is applied.

FIG. 11 is a flowchart corresponding to the operation of a facsimile machine having the above-described paper size detecting apparatus in which an image signal is transmitted by the transmission side after diminishing or enlarging the image signal and the transmitted image signal is received and outputted by the receiving side as it is.

In this case, the receiving side monitors whether or not there has been reception (Step S101).

If there has been reception, the size of recording paper is then detected by the above-described paper size detecting apparatus (Step S102), and the results of that detection are notified to the transmission side in accordance with facsimile procedures (Step S103).

On the basis of this notification, the transmission side transmits the image signal after diminishing or enlarging the image signal to be transmitted, in conformity with the size of the recording paper which the receiving side has.

As a result, if the transmitted image signal is received by the receiving side (Step S104), the receiving side is capable of obtaining a recorded image which can be recorded within the size of the recording paper which its own terminal has even if that image is processed as it is without being diminished or enlarged.

Figure 12:
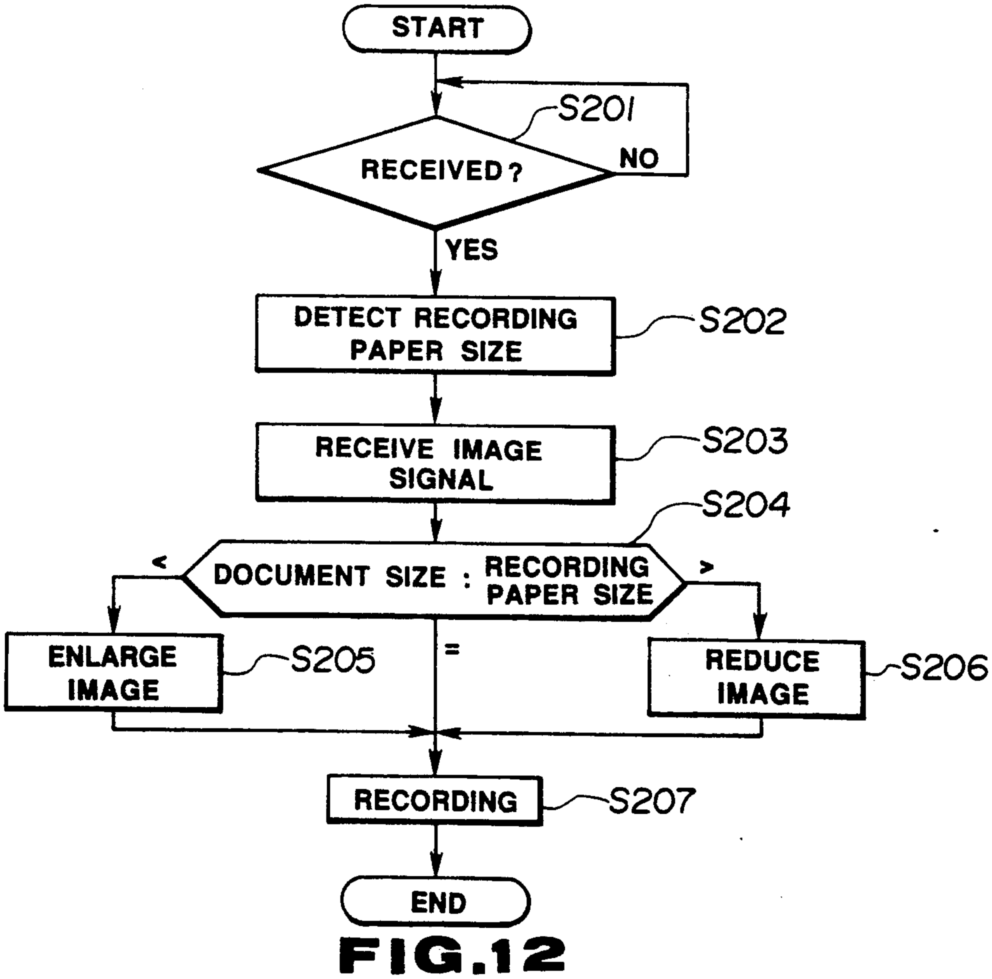

In addition, FIG. 12 is a flowchart corresponding to a receiving operation in which the receiving side enlarges or diminishes the received image signal in conformity with the size of the recording paper provided in its own equipment.

Figure 13:
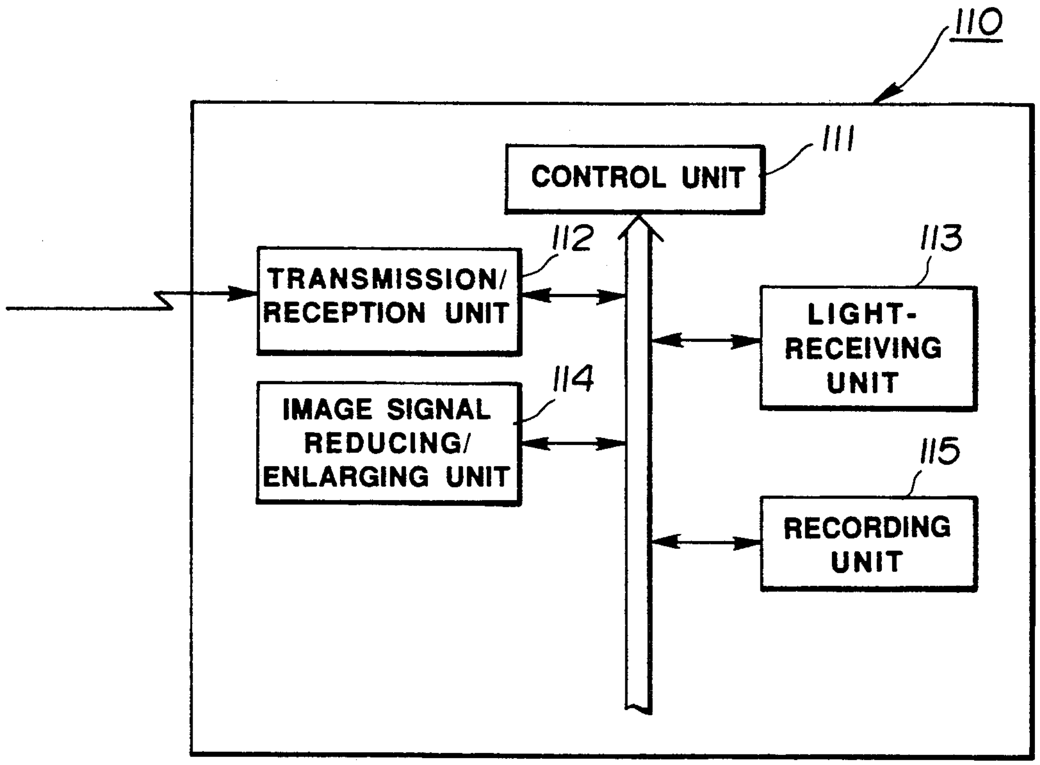
FIG. 13 is a block diagram illustrating an example of a configuration of the facsimile machine for realizing the receiving operation shown in FIG. 12.
Figure 14A:
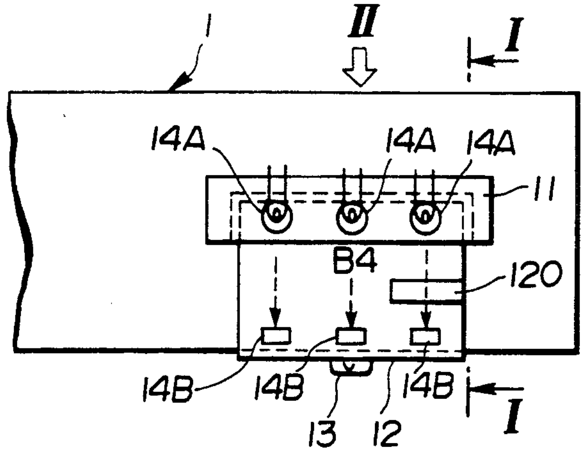
FIG. 14a (PRIOR ART)
FIG. 14*a* is a diagram schematically illustrating an arrangement of essential portions of one side surface of the cassette case to which a conventional paper size detecting apparatus of this type is applied.
Figure 14B:
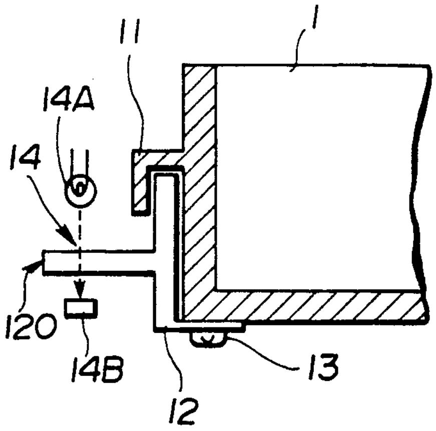
FIG. 14b (PRIOR ART)
FIG. 14*b* is a cross-sectional view of the arrangement of essential portions taken along the line I—I of FIG. 14*a;*
Figure 15A:
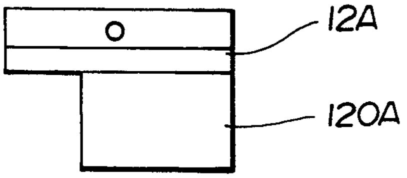
FIG. 15a (PRIOR ART)
FIGS. 15*a* to 15*c* are diagrams respectively illustrating examples of detection pieces used for the conventional paper size detecting apparatus.
Figure 15B:
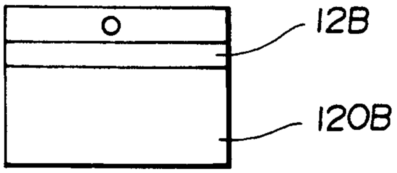
FIG. 15b (PRIOR ART)
Figure 15C:
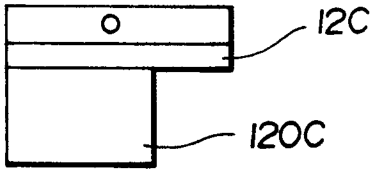
FIG. 15c (PRIOR ART)

A facsimile machine which permits this operation can be realized by an arrangement comprising a control unit 111, a transmission/reception unit 112, a light-receiving unit 113, a signal diminishing/enlarging unit 114, and a recording unit 115, as shown in FIG. 13.

In the facsimile machine 110 on the receiving side having the above-described arrangement, the control unit 111 monitors the transmission/reception unit 112 as to whether or not there has been reception (Step S201).

If there has been reception, the control unit 11 immediately detects the size of the recording paper of its own terminal by referring to an output signal from the light-receiving unit 113 (Step S202), and then the image signal is then received by the transmission/reception unit 112 (Step S203).

Subsequently, the control unit 111 compares the size of the recording paper provided in its own equipment with the size of the document size of the image signal received (Step S204).

Here, if the document size is smaller than the size of the recording paper, the image signal received is enlarged by the image signal diminishing/enlarging unit 114 within a range in which the image can be recorded on its recording paper, and the image signal is outputted to the recording unit 115 (Step S205).

On the other hand, if the document size is larger than the size of the recording paper, the image signal received is diminished by the image signal diminishing-/enlarging unit 114 so that the image can be recorded within the size of the recording paper, and the image signal is then outputted to the recording unit 115 (Step S206).

The recording unit 115 records the image on the recording paper by using the image signal of the outputted size as it is (Step S207).

At this juncture, since the image signal has been enlarged or diminished in conformity with the size of the recording paper through processing in Step S204, it is possible to eliminate such drawbacks as the recorded image being unduly larger or smaller than the size of the recording paper.

What is claimed is:

1. A paper size detecting apparatus in a recording system, which includes a cassette case for holding and feeding paper, the paper having one of a plurality of paper sizes, the apparatus comprising:

a detection piece having a detecting tongue;

detection piece holding means for movably and detachably selectively holding the detection piece on the cassette case in one of a plurality of different indicating positions each corresponding to one of the paper sizes; and means for detecting the indicating position of the detecting tongue and for generating a signal representative of the paper size, in accordance with the detected indicating position.

2. A paper size detecting apparatus according to claim 1, wherein the individual indicating positions correspond to all the paper sizes that can be detected by using said detection piece.

3. A paper size detecting apparatus according to claim 2, wherein said detection piece is provided with paper size indices indicating all the paper sizes that can be detected by using said detection piece, and a positioning mark is provided on a holding side of said detection piece, whereby when said detection piece is held in such a manner that one of said paper size indices matches said positioning mark, a correspondence is obtained between said paper size index and a paper size detected by said detection piece at that time.

4. A paper size detecting apparatus according to claim 3 wherein the detection of the positional pattern of said detecting tongue is effected by a plurality of pairs of sensors juxtaposed at predetermined intervals along a direction of movement of said detecting tongue in such a manner as to oppose said detecting tongue.

5. A paper size detecting apparatus according to claim 4 wherein each of said sensors comprises a transmission-type sensor for detecting the positional pattern of said detecting tongue in correspondence with the presence or absence of said detecting tongue with respect to an optical path between a light-emitting element and a light-receiving element.

6. A paper size detecting apparatus according to claim 4, wherein each of said sensors comprises a microswitch for detecting the positional pattern of said detecting tongue in correspondence with a state of contact of said detecting tongue with said microswitch.

7. A paper size detecting apparatus according to claim 5 or 6, wherein said detecting tongue of said detection piece has a different configuration for each standard of paper size.

8. A paper size detecting apparatus according to claim 7, wherein a direction in which said detection piece is moved and a direction in which said sensors are arranged are perpendicular to the plane of recording paper being accommodated in said cassette case.

9. A paper size detecting apparatus in a recording system, which includes a cassette case for holding and feeding paper, the apparatus for detecting the size of recording paper selectively accommodated in the cassette case, said apparatus comprising:

a detection piece having a detecting tongue of a configuration used commonly for a plurality of paper sizes;

detection piece holding means disposed on said cassette case, for detachably holding the detection piece by a pair of holding members, said detection piece holding means being adapted to movably hold said detection piece so that the detection piece can move to any one of a plurality of different holding positions at a time of attachment of the detection piece;

positional pattern detecting means for detecting a positional pattern of said detecting tongue resulting from the holding position of said detection piece; and paper size detecting means for producing a signal corresponding to the size of recording paper being accommodated in said cassette case on the basis of the positional pattern detected by said positional pattern detecting means.

10. A paper size detecting apparatus according to claim 9, wherein said detection piece holding means comprises a resilient member having a corrugated configuration, and said detection piece which is held by said detection piece holding means comprises a member having on one side thereof a corrugated configuration fitting with said resilient member.

11. A paper size detecting apparatus according to claim 10, wherein said corrugated configurations of said resilient member and said detection piece which fit with each other are so arranged that said detection piece which moves relative to said resilient member can be retained at individual positions corresponding to all the paper sizes that can be detected by using said detection piece.

12. A paper size detecting apparatus according to claim 11, wherein said detection piece has paper size indices indicating all the paper sizes that can be detected by said detection piece, and said detection piece holding means has one positioning mark, wherein when said detection piece is held in such a manner that one of said paper size indices matches said positioning mark, a correspondence is obtained between said paper size index and a paper size detected by said detection piece at that time.

13. A paper size detecting apparatus according to claim 12, wherein said positional pattern detecting means comprises a plurality of pairs of sensors juxtaposed at predetermined intervals along a direction of movement of said detecting tongue of said detection piece in such a manner as to oppose said detecting tongue.

14. A paper size detecting apparatus according to claim 13, wherein each of said sensors comprises a transmission-type sensor for detecting the positional pattern of said detecting tongue in correspondence with the presence or absence of said detecting tongue with respect to an optical path between a light-emitting element and a light-receiving element.

15. A paper size detecting apparatus according to claim 13, wherein each of said sensors comprises a microswitch for detecting the positional pattern of said detecting tongue in correspondence with a state of contact of said detecting tongue of said detection piece with said microswitch.

16. A paper size detecting apparatus according to claim 14 or 15, wherein said detecting tongue of said detection piece is formed into a different configuration for each standard of paper size.

17. A paper size detecting apparatus according to claim 16, wherein said detection piece holding means is disposed in such a manner as to be capable of moving said detection piece perpendicularly to the plane of recording paper accommodated in said cassette case, and said sensors are juxtaposed along a direction of movement of said detection piece.

* * * * *